Aug. 14, 1951 H. S. MORTON 2,564,272
FLOW METER ATTACHMENT FOR HOSE NOZZLES
Filed Oct. 6, 1947 2 Sheets-Sheet 1
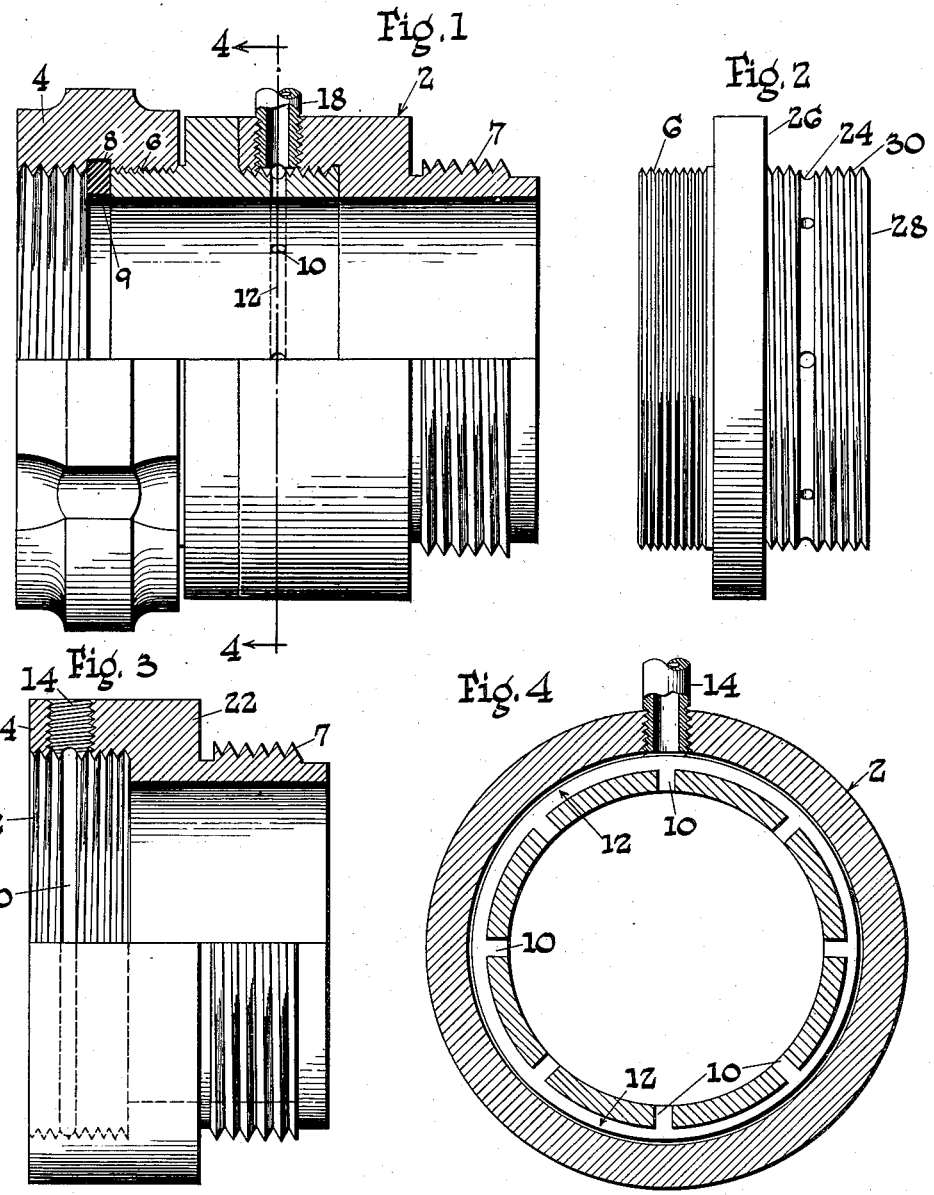
Henry S. Morton, Inventor
By Cushman, Darby & Cushman
Attorneys

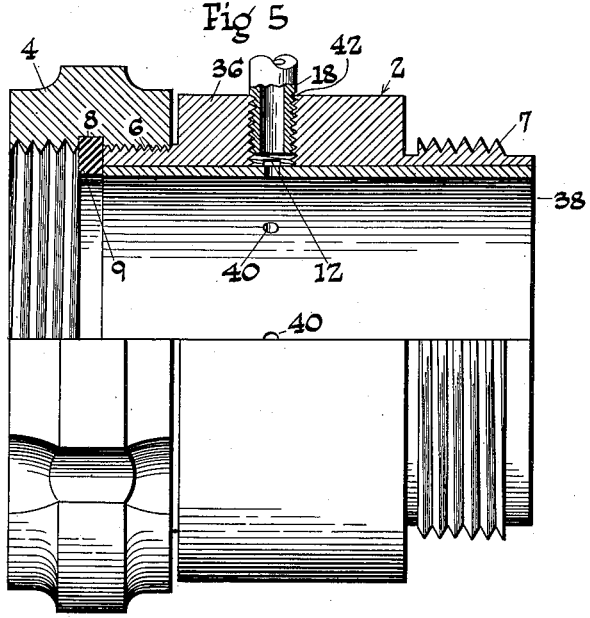

UNITED STATES PATENT OFFICE 2,564,272

FLOW METER ATTACHMENT FOR HOSE NOZZLES

Henry S. Morton, Norfolk, Va.

Application October 6, 1947, Serial No. 778,182

3 Claims. (Cl. 73—211)

This invention relates to flow meters of the type which will measure fluid flow through a fixed opening or nozzle. It is particularly concerned with flow measuring devices which may be coupled into fire hose, to fire nozzles, or to similar equipment in order to determine the amount of water flowing from the fire nozzle or through the equipment.

A principal object of this invention is a provision of a new type flow meter especially adapted for use with fire fighting equipment. Further objects include:

1. The provision of a flow meter which may be used to give an accurate reading of the volume of water flowing from the nozzle at the end of the line.

2. The provision of a flow meter which may be used to indicate volume of flow through all types of nozzles, including fog, mist, spray, converging, multiple jet or revolving nozzles, with all types of fluids, including water, fire fighting foam or the like.

3. The provision of a fire nozzle flow meter which permits the volume of flow from a fire nozzle to be determined without any interference with the stream issuing from the nozzle and which permits the rate of flow to be determined continually even under actual fire fighting conditions at the exact point of use.

4. The provision of a fire hose flow meter uniquely adapted for training purposes and for actual demonstration of proper use of fire fighting equipment.

5. The provision of a fire hose flow meter which may be permanently coupled into the nozzle in a fire hose line and which may be used to determine the flow rates from the nozzle without the necessity of referring to outside charts, tables, or the like.

Still further objects and a complete understanding of the structures involved with this invention will become apparent from the detailed description given hereinafter in connection with the attached drawings in which, Figure 1 is a side view, partially in section, of one form of the flow meters of this invention.

Figure 2 is a side view of one portion of the structure shown in Figure 1.

Figure 3 is a side view, partially in section, of another portion of the structure shown in Figure 1.

Figure 4 is a sectional end view taken along the line 4—4 of Figure 1.

Figure 5 is a side view, partly in section, of another form of the flow meters of this invention.

Figure 6 is a diagrammatic view of a fire nozzle and coupled hose incorporating a flow meter of the type illustrated in Figures 1 or 5, and Figure 7 is a detailed plan view of the gauge plate for use with the gauges employed with the flow meters of this invention.

Referring in detail to the drawings, my flow meters consist of tubular connector 2 provided at both ends with means for coupling the connector to hose sections, nozzles or other fluid lines used in fire fighting equipment. In the forms illustrated in the drawings, the connecting means comprise a hose swivel 4 which is expanded upon V-grooves 6 on the outside of one of the ends of the connector 2 and outside threads 7 on the other end of the connector which are adapted to be screw threaded into standard hose couplings or swivels. The swivel has a groove 8 at the inside end which carries a sealing washer 9.

The connector 2 is provided with a plurality of radial holes 10 which extend through the inner wall of the coupling into the interior thereof forming communicating passages between the interior of the connector and an annular channel 12 which is located between the interior and exterior walls of the connector. An opening 14 extends through the outer wall of the connector down to the level of the channel 12 communicating with the channel so as to form a fluid passageway between the channel 12 and the exterior of the connector. A pressure gauge 16 is connected to the opening 14 by means of a tubular connector 18.

In the form of my flow meter shown in Figure 1, the inner channel 12 is formed by the superposition of an annular, semi-circular channel 20 which is recessed in the inside wall of the tubular section 22 and an annular, semi-circular channel 24 recessed in the outside wall of the tubular section 26. The flange 28 whcih extends from one end of the section 26 and which carries the channel 24 is provided with external threads 30 which are adapted to screw thread into the internal screw threads 32 provided in the annular extension 34 on the tubular section 22.

The tubular connector 2 is assembled by threading section 26 into section 22 and joining the two together with a permanent setting joint compound. The assembled unit is then bored to size after which the swivel 4 is expanded to the V-grooves 6 of the unit.

In the embodiment of my invention shown in Figure 5, the channel 12 is rectangular in shape rather than circular as in the form illustrated in Figure 1. The channel is formed by a recess in the inner wall of the tubular section 36 which is covered by the press-fit sleeve 38. Radial holes 40, which are spaced equidistantly from one another, extend through the sleeve 38 and are positioned relative to the ends of the sleeve so that when the sleeve is fitted within the section 36, the holes 40 are located immediately over the channel 12. A hole 42 extends all the way through the section 36 connecting the channel 12 with the exterior of the connector 2.

Gauge 16 is provided with a chart such as that shown in Figure 7 which expresses the position of the indicator of the gauge in terms of gallons per minute or some other suitable measurement of volume flow. It has been proven by extensive experiment that the amount of liquid flowing from the end of a nozzle or other fixed opening in a fluid line under the turbulent flow conditions which prevail in fire fighting hoses and nozzles, that the static pressure which exists at the base of the nozzle or at a point along the length of the hose is a logarithmic function of the rate of flow of the liquid from the end of the nozzle or through the line. Thus, the rate of flow may be very accurately expressed by means of a chart carrying logarithmic scales such as illustrated in Figure 7.

The manner in which my flow meter is employed may be understood by reference to Figure 6. For example, a fire nozzle 44 is screwed upon the exterior threads 8 while the end of the fire hose 46 is coupled by means of the swivel 4 to the other end of the connector 2. With water issuing from the nozzle, as illustrated, the rate of flow from the nozzle is read directly from the gauge chart using the scale associated with the size of nozzle being used.

It has been shown by experimentation that the rate of flow can be accurately determined according to my invention, after a suitable chart has once been prepared, whether the flow is in a stream or in the form of a fog or mist. Thus, not only does my device permit the flow rates to be determined under actual conditions of operation, but also with mist or fog nozzles, in both of which cases other flow measuring devices, such as Pitot tubes, are of no use. Furthermore, my flow meters make possible the determination of flow rate measurements which are not varied by movements of the hose or by relative position of the flow meter and the nozzle. This is particularly important in actual operation because devices which have been used heretofore have given different readings for the same rate of flow depending upon the exact layout of the hose, or have not even permitted readings to be made if the hose or nozzle are moved.

In addition to measuring flow rates through fire fighting lines, my meters may be used to test the operation of fire hydrants, pump engines, special nozzles, and the like.

I claim:

1. A flow gauge mounting connection for use in measuring the flow of water through a fire nozzle comprising a tubular section connected at one end to a hose swivel and having an exterior threaded portion on the opposite end, a recessed channel about the outside of said threaded portion, and a plurality of equidistantly spaced holes through said section normal to the central axis of the tubular section extending into said channel and a second tubular section having an inside threaded portion at one end screw-threaded upon the outside threaded portion of the first tubular section to form a tubular connector, an outside threaded portion on the other end of said second section adapted for connection to a hose coupling, a recessed channel in said inside threaded portion of said second section positioned to match with the first mentioned channel when said tubular sections are assembled, and an opening through the wall of said section communicating with said recessed channel.

2. A flow gauge mounting connection for use in measuring the flow of water through a fire nozzle which comprises a tubular connector having a hose swivel attached at one end and an outside threaded portion at the other end adapted to screw thread into a hose coupling, said connector being made up of two tubular sections which are joined together to form the tubular connector, the first of said tubular sections having a tubular flange on one end through which extends a plurality of radial holes spaced equidistantly from one another and an annular channel recessed in the outside of said flange passing through the outer ends of each of said holes, said second tubular section having a tubular extension on one end extending over the flange of the first tubular section forming a fluid-tight connection between the two sections and an opening extending radially through said extension communicating with said annular channel in said tubular flange.

3. A flow meter assembly for measuring the flow of water through a fire nozzle which comprises a tubular connector having a hose swivel attached to one end and an outside threaded portion at the other end adapted to screw-thread into a hose coupling, said connector being made of two tubular sections joined together to form the tubular connector, the first of said tubular sections having a tubular flange on one end, a plurality of radial holes spaced equidistantly from one another extending through said flange and an annular channel recess in the outside of said flange passing through the outer ends of each of said holes, the second tubular section having a tubular extension on one end extending over the flange of the first tubular section forming a water-tight connection between two sections, an opening extending radially through said extension communicating with said annular channel in said tubular flange and a pressure-sensitive indicator connected to said opening.

HENRY S. MORTON.

REFERENCES CITED

The following references are of record in the file of this patent:

UNITED STATES PATENTS

| Number | Name | Date |
|---|---|---|
| 852,581 | Sanborn | May 7, 1907 |
| 2,105,967 | Burdsal et al. | Jan. 18, 1938 |
| 2,112,441 | Lewis | Mar. 29, 1938 |
| 2,217,668 | Burdsal | Oct. 15, 1940 |

FOREIGN PATENTS

| Number | Country | Date |
|---|---|---|
| 178,010 | Great Britain | Apr. 13, 1922 |